United States Patent
Lee et al.

(10) Patent No.: US 7,154,811 B2
(45) Date of Patent: Dec. 26, 2006

(54) SIMULATOR FOR DEVELOPING ACOUSTIC DETECTOR OF UNDERWATER VEHICLE

(75) Inventors: Dong Hun Lee, Jinhae (KR); Jae Beom Shin, Jinhae (KR); Myung Jong Yu, Changwon (KR); Woo Shik Kim, Jinhae (KR); Sang Moon Choi, Jinhae (KR)

(73) Assignee: Agency for Defense Development, Daejeon (KR)

( * ) Notice: Subject to any disclaimer, the term of this patent is extended or adjusted under 35 U.S.C. 154(b) by 281 days.

(21) Appl. No.: 10/835,730

(22) Filed: Apr. 30, 2004

(65) Prior Publication Data

US 2006/0256650 A1 Nov. 16, 2006

(30) Foreign Application Priority Data

May 2, 2003 (KR) .................. 10-2003-0028257

(51) Int. Cl.
*H04B 17/00* (2006.01)
(52) U.S. Cl. ....................................... 367/13
(58) Field of Classification Search ................. 367/13, 367/1; 434/6, 7, 8, 9, 10
See application file for complete search history.

(56) References Cited

U.S. PATENT DOCUMENTS

| | | | | |
|---|---|---|---|---|
| 3,713,081 A | * | 1/1973 | Murphree | 367/1 |
| 4,972,379 A | * | 11/1990 | Harris, Jr. | 367/13 |
| 2004/0228213 A1 | * | 11/2004 | Dutton et al. | 367/1 |

* cited by examiner

*Primary Examiner*—Dan Pihulic
(74) *Attorney, Agent, or Firm*—Scully, Scott, Murphy & Presser, P.C.

(57) ABSTRACT

A simulator for developing an acoustic detector of underwater vehicle precisely verifies performance of an acoustic detector by simulating an actual underwater environment, including target signal, applied to an underwater vehicle. The simulator an I/O communication unit for receiving information required for simulating an underwater environment from an acoustic detector and an motion simulator; a signal generator for receiving the information from the I/O communication unit to calculate a digital signal model; a D/A converter for converting the digital signal model into an analog signal; a signal conditioner for generating a signal similar to the signal of an actual underwater environment by controlling frequency and gain of the analog signal; and a remotely controlled computer for loading an OS to the signal generator and displaying various operation status.

11 Claims, 5 Drawing Sheets

US 7,154,811 B2

SIMULATOR FOR DEVELOPING ACOUSTIC DETECTOR OF UNDERWATER VEHICLE

BACKGROUND OF THE INVENTION

1. Field of the Invention

The present invention relates to a simulator for developing an acoustic detector of underwater vehicle, and more particularly, to a simulator for developing an acoustic detector of underwater vehicle capable of precisely verifying performance of an acoustic detector by simulating an actual underwater environment, including target signal, applied to an underwater vehicle.

2. Description of the Background Art

In development of an underwater vehicle having an acoustic detection/tracking function, the underwater vehicle is subjected to a land testing to verify its stability and reliability, before performing an underwater testing thereon.

However, in the conventional land testing, only the target tracking function of the acoustic detector was simply tested without considering an underwater environment that the underwater vehicle may get faced with, failing to verify precisely an operation and performance of the acoustic detector.

SUMMARY OF THE INVENTION

Therefore, an object of the present invention is to provide a simulator for developing an acoustic detector of an underwater vehicle capable of verifying an operation and performance of an acoustic detector as precisely as possible by providing the acoustic detector with signal generated using model of an environment similar to an underwater environment.

To achieve these and other advantages and in accordance with the purpose of the present invention, as embodied and broadly described herein, there is provided a simulator for developing an acoustic detector of an underwater vehicle, including: an I/O communication unit for receiving information required for simulating an underwater environment from an acoustic detector and an motion simulator; a signal generator for receiving the information from the I/O communication unit to calculate a digital signal model; a D/A converter for converting the digital signal model into an analog signal; a signal conditioner for generating a signal similar to the signal of an actual underwater environment by controlling frequency and gain of the analog signal; and a remotely controlled computer for loading an OS to the signal generator and displaying various operation status.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
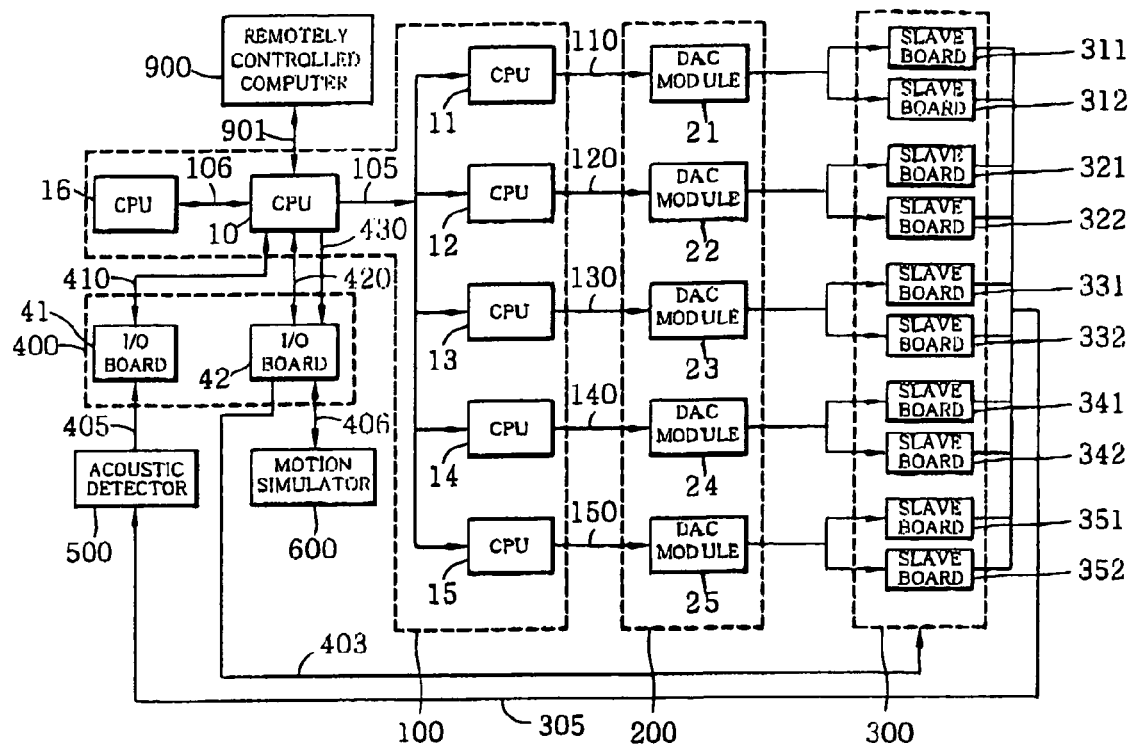
FIG. 1 illustrates the overall construction of a simulator in accordance with the present invention.

FIG. 1 illustrates the overall construction of a simulator in accordance with the present invention.

A simulator in accordance with the present invention includes a signal generator 100, a DA converter 200, a signal conditioner 300, an I/O communication unit 400 and a remotely controlled computer 900.

The signal generator 100 includes 7 CPUs 10~16. CPU 10 serves as a central controller for controlling an operation of the simulator, while the CPUs 11, 12, 13, 14 and 15 serve as a processor for performing an actual simulation, namely, calculating a signal model, according to a command from the central controller 10. The CPU 16 is an extra one prepared for performing an additional function or a signal model calculation.

The DA converter 200 includes five DAC modules 21~25, and converts a digital signal model calculated by the signal generator 100 into an analog signal.

The signal conditioner 300 includes ten slave boards 311~352, and serves to reproduce a signal similar to the signal in an actual underwater environment by controlling the frequency and the gain of an analog signal outputted from the DA converter 200.

The I/O communication unit 400 includes two I/O boards 41 and 42, and receives various data required for an acoustic detection/tracking from the acoustic detector 500 and the motion simulator 600 and transmits them to the signal generator 100.

The remotely controlled computer 900 loads an OS to the signal generator 100 and displays various events and operation status on a monitor upon receiving them from the signal generator 100. Namely, the remotely controlled computer 900, an Intel Pentium III processor-based single board computer, loads an operation program of the signal generator 100 and displays an operation state of the signal generator 100 and communication information of a peripheral device or the like on the monitor in a GUI environment.

The simulator in accordance with the present invention operates as follows.

First, the I/O communication unit 400 receives signal generation information (types of sound waves, periods or the like) from the acoustic detector 500 through the I/O board 41 (in case that an acoustic detection mode is a manual mode, there is no signal generation information from the acoustic detector 500), and receives position information of a target or an underwater vehicle and acoustic tracking information of the underwater vehicle from the motion simulator 600 through the I/O board 42.

The data inputted through the I/O communication unit 400 are transmitted to each processor unit 11~15 from the central controller 10 of the signal generator 100. Each processor units 11~15 calculate a signal model from the data, and in this case, the processor units 11~15 processes the data at a baseband for a real time processing. The digital signal models respectively calculated by each processor unit are inputted to the DA converter 200 by channels and then converted into analog signals respectively through DAC modules 21~25. The analog signals that have been respectively converted in the DAC modules 21~25 are respectively inputted to the slave boards 311~352 of the signal conditioner 300, where amplitude of the signals are attenuated and frequencies are modulated.

The signal from the signal conditioner 300 is inputted to the acoustic detector 500 where the signal is processed. The processed signal is transferred together with the signal generation information for a next signal model to the signal generator 100 through the I/O board 41 of the I/O communication unit 400.

As mentioned above, in the simulator in accordance with the present invention, a signal similar to a signal of an actual underwater environment is calculated upon receiving the data from the acoustic detector 500 and the motion simulator 600, and then, the acoustic detector 500 processes the calculated signal and feeds back the processed signal to the simulator, thereby performing a simulation on the acoustic detector.

Figure 2:
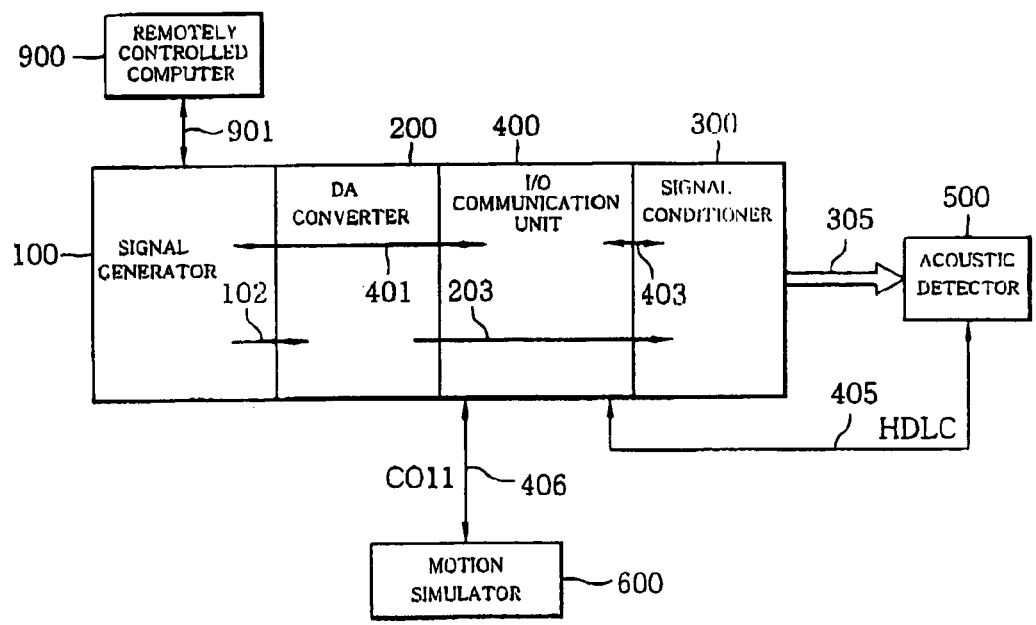
FIG. 2 illustrates a communication structure among elements of the simulator in accordance with the present invention.

FIG. 2 illustrates a communication structure among elements of the simulator in accordance with the present invention.

Each element has a different communication method, and the signal generator 100 communicates with each element through the I/O communication unit 400.

With reference to FIG. 1, the I/O communication unit 400 of a C40 based single DSP board includes two I/O boards 41 and 42. In the present invention, the I/O boards 41 and 42 are the same to each other, and can be set for a different usage.

The I/O boards 41 and 42 of the I/O communication unit 400 connect peripheral devices of various communication methods to the central controller 10 to perform a communication processing. In the present invention, a maximum three types of communications can be performed with the signal generator 100, the acoustic detector 500 and the motion simulator 600 through the line 401. The line 401 of a COM port bi-directional communication includes lines 410 and 420 of FIG. 1 and a line 430 of FIG. 4.

In detail, the first I/O board 41 is set to communicate with the acoustic detector 500 using a synchronous HDLC communication method through the line 405, and the second I/O board 42 is set to communicate with the motion simulator 600 using a C011 communication method through the line 406 and with the signal conditioner 300 using an asynchronous UART communication method through the line 403, thereby communicating with the signal generator 100. Such setting can be changed by software in booting according to a set value from the central controller 10 of the signal generator 100.

The line 901 is an optical cable for a COM port communication by means of an optical communication board. The remotely controlled computer 900 performs a COM port communication with the central controller 10 of the signal generator 100 through the line 901 to load the OS to the signal generator 100 and display an operational state of the signal generator 100, an acoustic detector 500 and the motion simulator 600 through the GUI program.

The line 102 is a COM port uni-directional communication to transmit a signal to be reproduced to the DA converter 200 and includes 110~150 through which the processor units 11~15 transmit a signal to the DAC modules 21~25 of the DA converter 200. Each line 110~150 has 8 channels and thus outputs signals of a total 40 channels. The line 203 is a line through which the DA converter 200 transmits an analog signal to the signal conditioner 300, and the line 305 is a line through which a gain and frequency-controlled signal is transmitted to the acoustic detector 500 by the signal conditioner 300.

Figure 3:
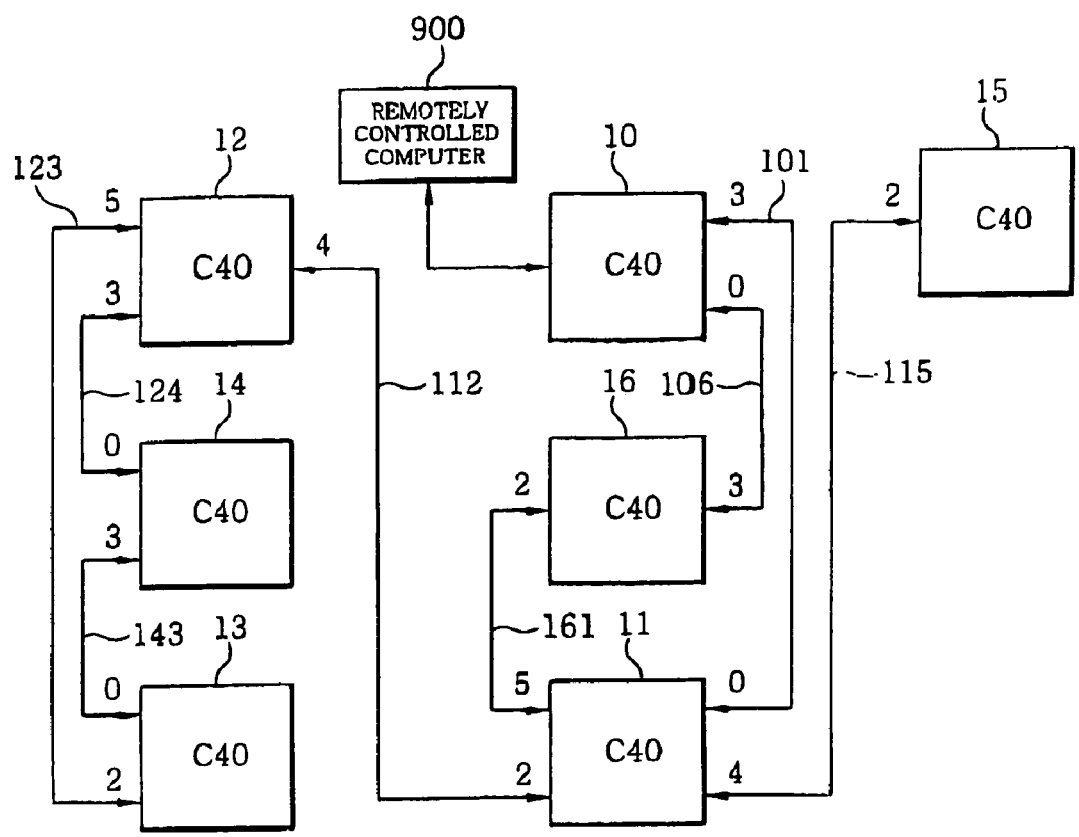
FIG. 3 illustrates the internal construction of a signal generator.

FIG. 3 shows the internal construction of the signal generator 100. Each CPU 10–16 comprising C40 is connected in a parallel processing structure.

The central controller 10 which is connected to the remotely controlled computer 900 through the line 901 is connected to five processors 11~15 through the line 105 in FIG. 1. The line 105 includes COM port lines 101, 115, 161, 112, 123, 124 and 143 as shown in FIG. 3.

The extra CPU 16 is connected to the central controller 10 through the line 106. The numerals attached on lines connected between each C40 indicate COM port numbers.

Data received from the I/O communication unit 400 is transmitted from the central controller 10 to the processor unit 11, and the processor unit 11 transmits the data to the processor units 12 and 15. The processor unit 12 transmits the data to the processor units 13 and 14.

The lines inside the signal generator 100 are connected by hardware, and a virtual communication line can be set by a C40 software can be set to transmit data to all the remaining six CPUs.

With this structure, the underwater acoustic signal model has a parallelism among channels by five processor units 11~15. Namely, since each channel generates a signal only with a variable required for a signal generation, the central controller 10 that calculates and sets a parameter can control every channel. Thus, the signal generator 100 has a processor farm structure of parallel processing models.

Figure 4:
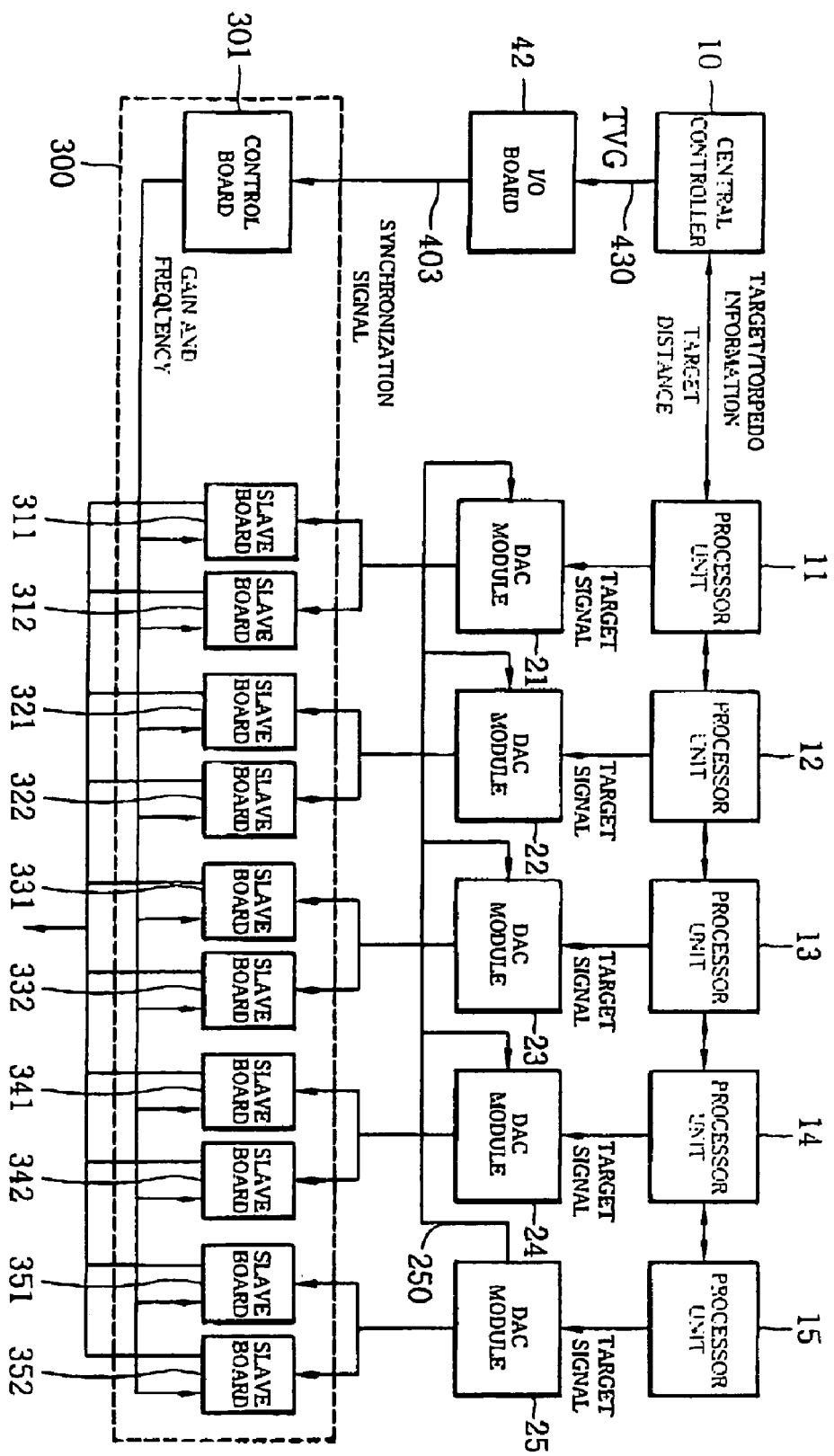
FIG. 4 is an explanatory view showing a synchronizing process of a DAC converter and a signal controlling process of a signal conditioner.

FIG. 4 shows connections between the DA converter 200 and the signal conditioner 300 and a synchronizing process by the DAC converter 200 and a signal controlling process by the signal conditioner 300.

In the present invention, it needs to change characteristics of simulated data by software. For this, limitation in a real time processing capability of the processor units 11~15 must be overcome. For instance, in order to reproduce 40 KHz of signal, data should be processed by the period of at least 12.5 μs, which is, however, impossible under a current technology. Thus, the signal must be processed in a baseband of a few KHz, and then, modulated to a frequency of 40 KHz.

In addition, since the underwater acoustic signal has a small amplitude of lower than 100 dB, no matter how good performance the DA converter 200 has, it cannot reproduce a signal of scores of nV. Thus, the limitation of resolution of the DA converter 200 should be overcome.

In general, synchronization of output signals among multiple channels should be considered in the multi-channel DA converter. Since the simulated acoustic signal has much information in a phase difference as well as in the amplitude, if synchronization is not made, a simulation suitable to the input parameter cannot be performed.

In order to solve the problem, a general DAC module controls an overall synchronization by using an external synchronous signal. This kind of synchronization structure has a simple characteristics, but is limited in its extendability because a part to be synchronized increases according to a signal model precision and increase in the number of channels in order to synchronize even the processor unit performing a signal simulation as well as the DA converter at an initial signal conversion point. In addition, even if the synchronization is made, synchronization among processor units should be continuously made, so programming is difficult.

Synchronization and signal controlling process will now be described with reference to FIG. 4.

The processor unit 11 receives target/torpedo information from the central controller 10 and distributes the information to each processor unit 12~15. Then, each processor unit 11~15 calculates signal data by DAC modules 21~25 of the DA converter. At this time, for a gain control of the signal conditioner 300 according to a target distance, a target distance inputted to the central controller 10 is converted into a gain control value called TVG and transmitted to the second I/O board 42 via the line 430 and then transmitted to the control board 301 of the signal conditioner 300 via the line 403.

The processor units 11~15 calculate signal data with respect to the target and transmit a digital signal to each DAC module 21~25. In this case, since each processor unit 11~15 cannot process data in parallel and simultaneously calculate the signal data, the target signal data are not simultaneously transmitted to the DA converter 200. Then, analog signals from the DA converter 200 cannot be simultaneously inputted to the signal conditioner 300, so signal synchronization in the DA converter 200 is required.

For this purpose, the DAC module 25 of the DA converter 200 is set as a master. When the target signal data is transmitted to the DAC module 25, a synchronization signal is transmitted to the remaining DAC modules 21~24 through the line 250, whereby the synchronized analog signal can be inputted to the signal conditioner 300. The line 250 is constructed as a DAC control network as shown in FIG. 5.

The synchronized analog signal is inputted to slave boards 311~352 of the signal conditioner 300. Each slave board receives a frequency band to be modulated from the control board 301, modulates a frequency band of the analog signal, and receives the gain control value, and then, attenuates the amplitude of the analog signal. In the present invention, the gain control value can be adjusted in a dynamic range from 0 dB (a few V) up to hundreds of dB (scores of nV), thereby adjusting the gain of signal extensively.

Figure 5:
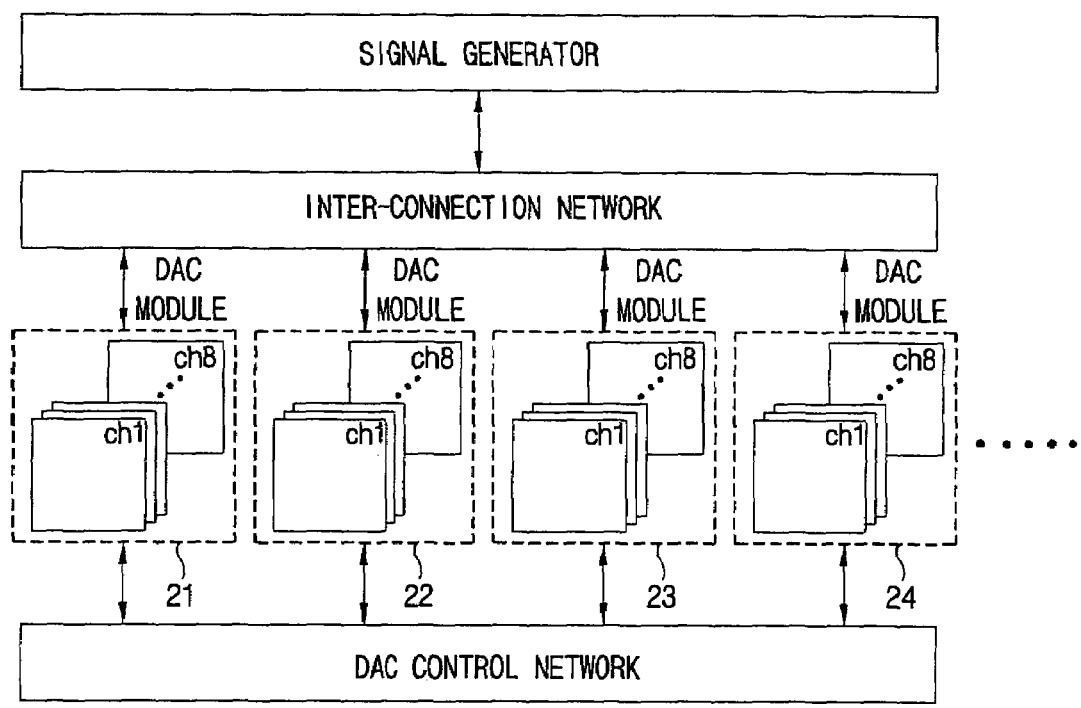
FIG. 5 illustrates the hardware-based construction for synchronization of D/A converter.

FIG. 5 shows the construction of DA converter 200 by hardware.

As shown in FIG. 5, the DA converter 200 includes an inter-connection network through which a digital underwater acoustic environment signal (digital signal model) is inputted from the signal generator 100, DAC modules 21~24 for converting a digital signal to an analog signal, and a DAC control network for controlling synchronization among channels.

In the present invention, each DAC module 21~24 of the DA converter 200 is connected to the DAC control network. The DAC control network receives a signal 'Ready' for every sample from each DAC module 21~24. This signal means that each channel is ready to transmit data. When every channel is ready, the DAC control network generates a signal 'Load' and transmits it to control synchronization of each channel.

In the present invention, the DAC modules 21~24 adopts a VME bus of standard bus requirements that is commonly used for a large system, and are designed to have a size of 6U. Each module has 16 bit resolution, and can be DA-converted up to a maximum eight channels. In addition, a sampling rate is a maximum 200 KHz. The sampling rate is sufficient considering the fact that a band of a general acoustic detector is less than 100 KHz. Moreover, since each module can select arbitrary channels and the number of channels from eight channels, it can be applied even to an arbitrary structure of the signal generator 100.

Figure 6:
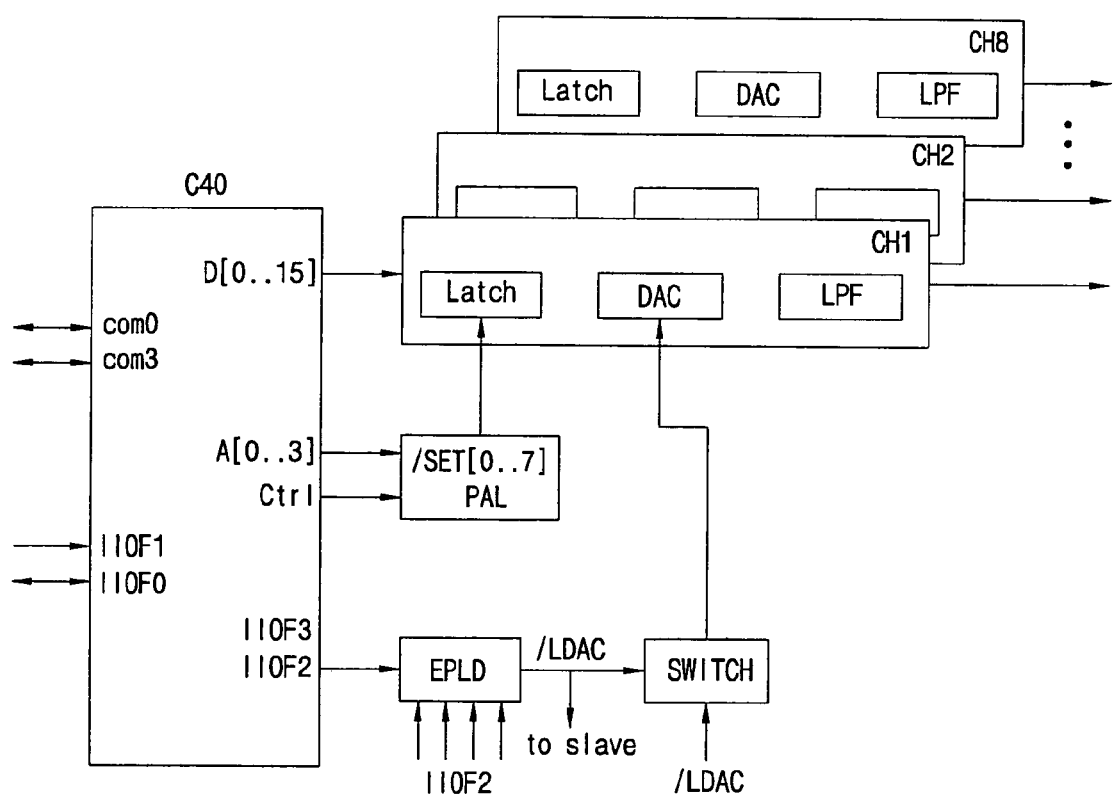
FIG. 6 illustrates the internal construction of a DAC module.

FIG. 6 shows the internal construction of the DAC modules 21~24 comprising a C40 based DSP board.

A master and a slave are set to determine the subject of synchronization. In a DAC module set as a master, a pin of 'to slave' is activated, and in a DAC module set as a slave, a pin of '/LDAC' is activated.

When a digital signal model is inputted from the signal generator 100 via com0 or com3, a synchronous signal is inputted from the mater DAC module to the '/LDAC' of the slave DAC module. When the synchronous signal is inputted, the DAC is operated through an internal switch in each module, so that channels CH1~CH8 perform an analog conversion respectively.

Namely, digital signal models of eight channels per board from the signal generator 100 are converted into analog signals through the eight DACs of the DAC module are separated into four channels to be transmitted to two slave boards (each can process four channels) of the signal conditioner 300.

As so far described, the simulator for developing an acoustic detector of an underwater vehicle in accordance with the present invention has the following advantages.

That is, for example, since a signal model of an environment similar to the underwater environment is simulated and provided to the acoustic detector, the operation and performance of the acoustic detector can be verified to its maximum.

In addition, since multiple underwater testings are not required for a performance evaluation of the acoustic detector, cost and time required for testing can be reduced.

Furthermore, it needs to use several channels to process signals according to the type or characteristics of the acoustic detector of the underwater vehicle, but according to the present invention the DAC control network is designed in the DA converter so that channel expandability is easy.

As the present invention may be embodied in several forms without departing from the spirit or essential characteristics thereof, it should also be understood that the above-described embodiments are not limited by any of the details of the foregoing description, unless otherwise specified, but rather should be constructed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A simulator for developing an acoustic detector of an underwater vehicle, comprising:

an I/O communication unit for receiving information required for simulating an underwater environment from an acoustic detector and a motion simulator;

a signal generator for receiving the information from the I/O communication unit to calculate a digital signal model;

a DA converter for converting the digital signal model into an analog signal;

a signal conditioner for generating a signal similar to the signal of an actual underwater environment by controlling frequency and gain of the analog signal; and a remotely controlled computer for loading an OS to the signal generator and displaying various operation status;

wherein the signal generator comprises:
a central controller for receiving the information and controlling operations of the simulator; and
a plurality of processor units for calculating and generating the digital signal model for each channel according to a command of the central controller, wherein the central controller and the plurality of processor units are connected in a process farm structure so that a signal model among channels has parallelism.

2. The simulator of claim 1, further comprises:
an extra CPU for performing an additional function or a signal model calculation.

3. The simulator of claim 1, wherein the DA converter includes a plurality of DAC modules corresponding to the plurality of processor units, and the DAC modules are connected by a DAC control network for synchronization of output signals among channels.

4. The simulator of claim 3, wherein the DAC control network receives a ready signal from the plurality of DAC modules and then generates a load signal for each sample, to thereby synchronize each channel.

5. The simulator of claim 1, wherein the signal conditioner comprises:
a control board for outputting a control signal on the basis of a frequency band to be modulated and a signal gain value; and
a plurality of slave boards for controlling frequency and amplitude of an analog signal of the DA converter according to the control signal.

6. The simulator of claim 5, wherein the signal gain value is calculated in the central controller and provided to the control board while a processor unit calculates a signal model.

7. The simulator of claim 5, wherein the I/O communication unit comprises:
a first I/O board for communicating with the acoustic detector; and
a second I/O board for communicating with the motion simulator and the control board.

8. The simulator of claim 7, wherein the first and second I/O boards performs a communication processing by connecting peripheral devices of various communication methods to the central controller.

9. The simulator of claim 8, wherein the connection between the central controller and the peripheral devices is set by software.

10. The simulator of claim 1, wherein the remotely controlled computer is connected to the central controller of the signal generator by an optical cable and communicates with the central controller in a C40 COM port.

11. The simulator of claim 1, wherein the signal generator, the DA converter and the I/O communication unit are constructed as a C40 based single DSP board.

* * * * *